United States Patent [19]

Ikami

[11] Patent Number: 4,495,118
[45] Date of Patent: Jan. 22, 1985

[54] CERAMIC PLATES AND METHOD FOR THE PRODUCTION THEREOF

[75] Inventor: Hideo Ikami, Tochigi, Japan

[73] Assignee: Nippon Chemiphar Co., Ltd., Tokyo, Japan

[21] Appl. No.: 484,724

[22] Filed: Apr. 13, 1983

[51] Int. Cl.³ .............................................. C04B 33/24
[52] U.S. Cl. ...................................... 264/25; 264/56; 264/148
[58] Field of Search ................ 264/25, 56, 62, 177 R, 264/64, 148

[56] References Cited

U.S. PATENT DOCUMENTS

| | | | |
|---|---|---|---|
| 2,143,003 | 1/1939 | Gould | 264/58 |
| 2,454,708 | 11/1948 | Middleton | 264/64 |
| 3,442,994 | 5/1969 | Herbert | 264/57 |
| 3,487,135 | 12/1969 | Harsler | 264/64 |
| 3,904,352 | 9/1975 | Thurnauer | 264/58 |
| 4,183,885 | 1/1980 | Marazzi | 264/58 |

FOREIGN PATENT DOCUMENTS 34213 3/1976 Japan .
34908 3/1976 Japan .

Primary Examiner—John A. Parrish
Attorney, Agent, or Firm—Oblon, Fisher, Spivak, McClelland & Maier

[57] ABSTRACT

Large and thin ceramic plates of, particularly at least 30×30 cm in size and not greater than 20 mm especially not greater than 8 mm in thickness and having oriented crystals are produced by a method comprising drawing a green body from an extruder in a curved shape, cutting and spreading the green body in a plate form, rolling the plates in the same direction as that of drawing, subjecting the rolled plates to the treatment with far infrared rays or high-frequency heating before the plates contain a moisture reduced to less than 15% while the plates are transferred in the same direction as that of drawing, drying the plates thus treated while the plates are further transferred in the same direction, and then firing the plates in a kiln. The ceramic plates are large and thin but nevertheless easy to handle.

12 Claims, 4 Drawing Figures

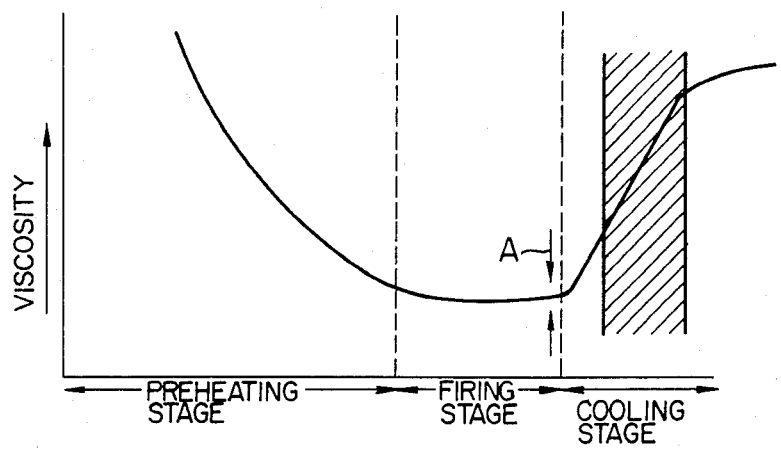
FIG. I
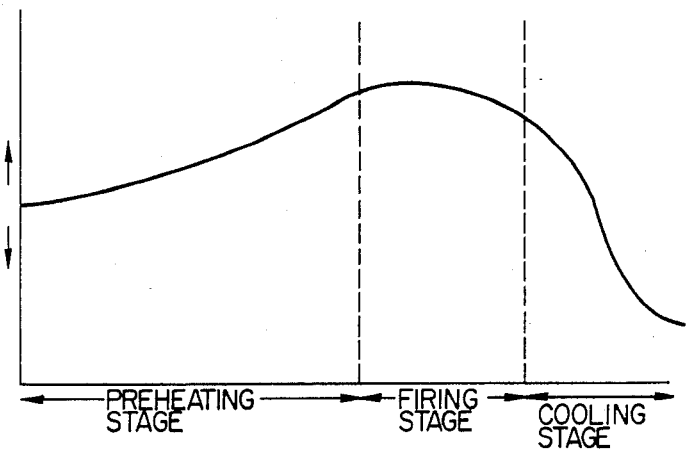
FIG.2

CERAMIC PLATES AND METHOD FOR THE PRODUCTION THEREOF

This invention relates to a method for producing ceramic plates, in particular to a method for producing thin ceramic plates having a large surface area and still more particularly to novel ceramic plates containing oriented crystals.

As a method for producing thin ceramic plates having a large surface area, there has hitherto been proposed a method comprising providing a green body through an extruder, rolling said green body in the same direction as that of extrusion and then again rolling the green body in the direction perpendicular to that of extrusion to eliminate the directional properties of the green body, and thus repeating several times the rolling steps alternately in the direction of extrusion and in the direction perpendicular thereto to completely eliminate the directional properties of the body, finally drying and firing the body, or a method comprising drawing a green body in a curved shape through an extruder such as a deairing pug-mill, cutting and spreading the body in a plate form, rolling the resulting plates through rollers, drying and firing the plates.

These methods hardly produce, in an industrial scale, large and thin ceramic plates of, for example, at least 30×30 cm in size and not more than 20 mm, especially not more than 8 mm in thickness. That is, in accordance with these methods, such ceramic plates are difficult to prepare with a lower degree of the generation of strain or warp, a higher in-plane precision and a higher rate of production in good quality.

One object of this invention is to provide a method for continuously producing ceramic plates having a large surface area of, for example, at least 30×30 cm and a thickness of, for example, not greater than 20 mm, especially not greater than 8 mm with no strain or warp generated and with high in-plane precision, in an industrial scale.

Another object of this invention is to provide novel ceramic plates containing oriented crystals.

In accordance with this invention, a green body is drawn in a cross-sectional shape curved in a hollow circular contour or similar contours (hereinafter referred only to "curved shape") from an extruder such as a deairing pug-mill, cut and spread in a flat state or in a plate form, rolled in the same direction as that of drawing, then treated with far infrared rays or high-frequency heating before the moisture content of the spread plates of the green body is reduced to less than 15% while the plates are transferred in the same direction as that of drawing, then dried, preferably dried and calcined, while the plates are further transferred in the same direction, and finally fired in a kiln. Thus, novel ceramic plates containing oriented crystals are produced.

In this invention the ceramic plates include vitreous china wares, earthern wares, stone wares, clay wares, etc.

In the method of this invention, the reason for using a green body drawn from an extruder such as a deairing pug-mill is that when the green body is drawn in a curved shape from the extruder, the green body contains most uniformly oriented crystals. The curved shape may include a hollow semicircular shape, hollow elliptical shape or the like as well as the above-mentioned hollow circular shape.

The green body drawn in a hollow circular shape is cut and spread to obtain green plates, which are then rolled while being transferred in the same direction as that of drawing. In this case, rollers used may be of a conventional type, and a pair or pairs of rollers are preferably used, each of which has a channel helically cut in the surface thereof in a direction opposite to the direction of the channel of the other roller, so as to prevent the rolled green body from being squeezed out beyond the width of the rollers, in order to allow the crystals in the green body to be oriented more uniformly in the direction of drawing. Such rollers prevent the green plate from being extended in the direction perpendicular to that of drawing or rolling, thereby retaining the original width of the drawn plate and obtaining more uniformly oriented crystals in the green plate.

The moisture content of the green plate thus rolled is preferably at least 15%, more preferably 17 to 20%, based on the dry weight of the green plate. In order to control the moisture content, a deflocculant such as sodium phosphate and stearic acid may be added to the green plate preferably in an amount of 0.1 to 0.5% by weight. .P The first stage of the rolling step in the method of this invention is desirably carried out at a temperature of 30° to 60° C. in such a manner that the moisture content of the green plate is not reduced. Such a temperature condition is necessary in the first stage of the rolling step but not always necessary in the second stage of the rolling step. Furthermore, a higher temperature of the green body is not preferred in an extruder, because the extruder may run idle. When the green body from an extruder is to be heat-treated before the rolling step, the heat treatment is preferably carried out by steam, high-frequency heating or far infrared rays so as not to lose the moisture content from the green body. In case room temperature is high, the temperature of the green body may reach the above-mentioned rolling temperature due to the accumulation of heat in the green body itself during drawing operation. In such a case, no heat treatment is always needed.

When the green body is within the above-mentioned temperature range, the water vapor pressure in the green body gets higher. Thus, the water vapor in the green body acts as a "lubricant" to make it possible to roll the green body uniformly with a small amount of residual strain from the rolling step. Even the green body made from a composition having a lower platicity can be rolled at a high rate due to the presence of the water vapor. An optimum temperature within the above-mentioned temperature range varies depending upon the content of plastic clay materials contained in the green body. In case the content of plastic clay materials is lower, the water vapor pressure in the green body is raised at an elevated temperature to enhance the lubricating action of water. At a temperature exceeding 60° C. water vapor is lost rapidly during rolling, so that there often occurs cleavage due to a difference in density between the surface and the core of the green body. In case the rolling temperature is lower than 30° C., the lubricating effect of water vapor cannot be obtained.

After the green body in a plate form (green plate) is rolled in the first stage, it is preferably finished through rollers having a flat surface thereon or, if necessary or if desired, a patterned surface. This finishing step is not always necessary to carry out at a temperature of 30° to 60° C.

In accordance with this invention, the step subsequent to the rolling step is carried out by subjecting the green plates to the treatment with far infrared rays or high-frequency heating while the moisture content of the green plates is not less than 15% by weight. This treatment with far infrared rays or high-frequency heating is carried out for the purposes which are different from those in the conventional rapid drying techniques. The purpose for the treatment is to eliminate residual strain generated in the foregoing step for a short period of time. The time of this treatment may be such that the moisture content of green body is not reduced to less than 15% by weight. Generally, the time is 1.5 to 6 minutes, preferably 2 to 5 minutes. If the time is too much shorter, the residual strain is not adequately dispersed. On the other hand, if the time is too much longer, the moisture content of green body is undesirably reduced. When the moisture content is less than 15% by weight, the interior of green body is rapidly hardened and lacks viscous flow required for eliminating residual strain. As a result, the green body becomes hard with strain left therein, which strain causes the deformation or cracks of the green body in the subsequent drying step.

This treatment with far infrared rays or high-frequency heating should be carried out while a green body is transferred by, for example, a mesh belt conveyor in the same direction as that of drawing the green body. Thus, the crystals in the green body are most uniformly oriented in the direction of drawing.

In this treatment, a source of far infrared rays or high-frequency heating is preferably positioned in such a manner that it is perpendicular to the traveling direction of the mesh belt conveyor and either above or under the conveyor, preferably both above and under the conveyor. Furthermore, this source is preferably positioned linearly to be parallel to the surface of the conveyor and positioned at a distance from the conveyor.

After the treatment with far infrared rays or high-frequency heating, the green body is dried while being transferred in the same direction as that of drawing. Transferring of the green body makes it possible to operate the method of this invention in a continuous manner.

In the method of this invention, a dryer of any type which is operable in a continuous manner may be used, and a hot-air dryer of a mesh belt type is preferred. The drying is carried out at a temperature of, for example, 70° to 550° C., preferably 100° to 200° C. for a period of 30 minutes to 2 hours. This period of time for drying is much shorter than that required by a prior art large green plate, i.e., at least 10 hours.

The dried, preferably dried and calcined, green body has a bending strength in the direction of drawing which is 30% greater than that in the direction perpendicular to that of drawing, because crystals in the green body are most uniformly oriented and strain is eliminated.

It has been common knowledge in the art that the orientation of crystals should be eliminated and strain should be removed. In contrast, the present inventors have found that thin ceramic plates having a large surface area and free of strain or warp can be obtained with high in-plane precision and extremely low percentage of rejects by orienting crystals in a green body most uniformly in the direction of drawing and eliminating strain.

The dried green body may be glazed, if desired, and then it is finally fired in a kiln.

In accordance with this invention, even large thin ceramic plates, for example, of at least 30×30 cm in size and, not greater than 20 mm, especially not greater than 8 mm in thickness can be produced with no strain or warp generated and with high in-plane precision. According to the prior art methods such large thin ceramic plates are produced with a higher percentage of rejects, i.e., about 30%, whereas according to the method of this invention large thin ceramic plates can be produced with a percentage of rejects not exceeding 5%.

When the green body is fired in a kiln at a temperature and for a period of time insufficient to vitrify the oriented kaolinite crystals of the green body to give complete non-orientation of crystals, that is, insufficient to eliminate the orientation of crystals in the direction of drawing, the resulting ceramic plates have a higher initial bending strength in the direction of drawing than that in the direction perpendicular to that of drawing; for example, the former being 20 to 70%, in many cases 25 to 50%, higher than the latter. In one embodiment of this invention, when products resulting from firing a green body in a kiln at 1130° C. for 1 hour, which temperature and period of time are insufficient to give complete non-orientation, are ceramic plates having a water absorbing capacity of 15% and a thickness of 4 mm and contain a vitreous phase of less than about 10%, they have bending strengths of 210 kg/cm in the direction of drawing and 130 kg/cm in the direction perpendicular to that of drawing.

On the other hand, when a green body is fired adequately, that is, at a temperature and for a period of time sufficient to vitrify the green body, in a kiln, no orientation of crystals is substantially found. However, if needle-like crystals such as mullite are incorporated into the green body, it can be observed that the resulting product has the crystals of mullite oriented therein. Ceramic plates fired in a kiln at 1220° C. for 1 hour to be vitrified to a water absorbing capacity of 0% contain substantially no crystals of kaolinite, that is, it comprises a vitreous phase alone. On the other hand, it can be observed that ceramic plates made from a green body into which mullite is beforehand incorporated have oriented crystals of mullite. The mullite-containing ceramic plates of 4 mm in thickness have bending strengths of 450 kg/cm in the direction of drawing and 310 kg/cm in the direction perpendicular to the direction of drawing.

The novel oriented crystal-containing ceramic plates according to this invention have a greater bending strength in the direction of orientation than that of prior art ceramic plates and, therefore, they can easily be handled with little fracture, particularly when formed in a large and elongated form and stacked up in the longitudinal direction. It has been found that such advantages can be obtained by giving a bending strength in the direction of drawing which is 1.2 times or more greater than that in the direction perpendicular to that of drawing. However, the ceramic plates having a bending strength in the direction of drawing which exceeds 2.0 times as great as that in the direction perpendicular to the direction of drawing is difficult to prepare.

In the method of this invention, any type of kilns such as a tunnel kiln, shuttle kiln and roller hearth kiln may be used.

Of these kilns, the roller hearth kiln is preferred since a green body or a glazed green body should preferably be fired in a continuous manner. However, in the case of using the roller hearth kiln, attention should be paid to the direction of transferring the green body. If the direction of transferring is perpendicular to the direction of drawing, the percentage of rejects is highly increased. Therefore, in accordance with the method of this invention a green body is required to be fired, preferably in the roller hearth kiln, in such a manner that the direction in which the green body is drawn from a deairing pug-mill is identical with that of transferring the fired body. Thus, the percentage of rejects can be prevented from being raised.

In order to further decrease the percentage of rejects in the roller hearth kiln, cold air is preferably sprayed through narrow openings such as slits against a fired body at both the sides thereof after the body is passed through the highest-temperature region of kiln and before the vitreous phase begins to be solidified, thereby quenching it to a solid state.

When a green body is fired at a temperature of higher than 1000° C., the amount of a vitreous phase is increased as the temperature is raised, and when the body reaches its sintering temperature, it gets flexible and viscous. Therefore, the body hangs down between the rollers in the roller hearth kiln. Such hanging causes an increased percentage of rejects. Therefore, the roller hearth kiln should preferably be used under such conditions as mentioned above.

The purpose of quenching under such conditions as mentioned above in the roller hearth kiln is to prevent the generation of strain and warp in ceramic plates. On the other hand, in a prior art method using the roller hearth kiln at a maximum temperature of, for example, 1200° C., the quenching is carried out by blowing cold air and cooling from 1000° C. to 700° C. at a cooling rate of 50° to 80° C. minute for the purpose of shortening the cooling time. Thus, prior art cooling is merely carried out for shortening firing and cooling time and not useful for preventing the generation of strain and warp in thin ceramic plates.

With reference to the accompanying drawings, this invention will be further illustrated in detail below.

FIG. 1 is a graph showing a general viscosity curve of a vitreous china plate when fired.

FIG. 2 is a graph showing an expansion or contraction curve of a vitreous china when fired and solidified, corresponding to the curve of FIG. 1.

Figure 3:
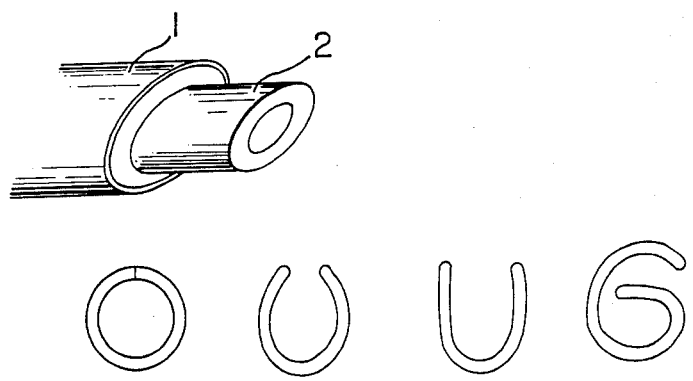
FIG. 3 is a perspective view of a green body being drawn from a deairing pug-mill in a circular form, and a cross-sectional view of the green body.
Figure 4:
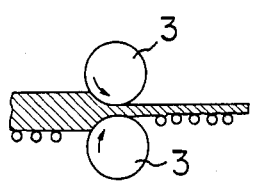
FIG. 4 is a profile of a green body being rolled.

A curve showing the viscosity of a green body when fired and cooled is shown in FIG. 1.

The viscosity is gradually reduced as the body is transferred successively to a preheating stage, firing stage and cooling stage. In a region between the firing stage and cooling stage there is a transition point. In this region, rapid contraction of the body occurs, as shown in FIG. 2 in which a specific volume curve of a fired body is drawn. The "quenching" referred to in this invention means that it is carried out by air cooling in a temperature region before the transition point is reached, preferably in an A region at a slightly higher temperature than the transition point of the body, as shown in FIG. 1. The quenching may be carried out by spraying air against ceramic plates through a pair of slit nozzles provided above and under the rollers in the direction perpendicular to the direction of transferring the plates. The slit nozzles have an opening width of desirably 50 mm or less. The distance between the ends of the nozzles and the ceramic plates is desirably 80 mm or less. A plurality of pairs of slit nozzles may be used. The amount of cold air blown from the slit nozzles varies depending upon the thickness of ceramic plates. Generally, the surfaces of ceramic plates are cooled at a cooling rate of higher than 100° C./minute, preferably higher than 150° C./minute.

For example, the rollers of a roller hearth kiln are rotated so that a fired body may be transferred at a rate of 100 to 500 mm/minute, and cold air at room temperature is sprayed against the fired body at a pressure of 300 to 500 mmAq for about 10 seconds to 2 minutes, whereby the temperature of the fired body at the surface thereof is rapidly decreased and the resulting ceramic plates are free of strain and warp.

Thus, the quenching in accordance with this invention is carried out at a higher temperature than the transition point at which point the ceramic plates are solidified, i.e., before the ceramic plates lose their flexibility, but, on the other hand, the quenching stage in the prior art is carried out within the hatched range shown in FIG. 1, i.e., after the ceramic plates pass the transition point and are solidified. Since the process time is thus shortened in this invention, there is a clear difference between this invention and the prior art.

Furthermore, in this invention a conventional wide-range quenching method, in order to shorten the length of such a roller hearth kiln as used in the prior art may be used.

This invention using a roller hearth kiln having a quenching stage with the slit nozzles can reduce the percentage of rejects due to strain and warp of ceramic plates down to 3% or less and continuously produce large ceramic plates in a highly shortened period of time (from the start of drawing to the end of firing), as compared with a period of time required by the prior art.

The features and advantages of this invention have been discussed above in detail and other features and advantages of this invention will further be explained below with reference to the following examples.

EXAMPLE 1

A mixture comprising 58 parts by weight of feldspar, 37 parts by weight of clay, 5 parts by weight of talc and 0.2 parts by weight of sodium phosphate and containing a moisture content of 18.5% by weight, was drawn from a dearing pug-mill into a cylindrical form having a thickness of 20 mm and a diameter of 230 mm. The cylindrical form was cut and spread in a plate form. The green body plates thus obtained were passed through a conveyor-type tunnel kiln provided with a panel-type far infrared may heater having a power of 2 kW and maintained at a relative humidity of 80 to 85%, in the direction of drawing for 4 minutes. In the kiln the green plates were heated to 40° to 42° C. The green plates were then transferred in the same direction as that of drawing and rolled between rollers. The resulting ceramic plates had a size of 300×600 mm and a thickness of 5 mm. The green plates had a moisture of 17.4% by weight.

These green plates were immediately transferred by the conveyor traveling in the same direction as that of drawing to a 6 kW far infrared ray heater, from which the plates were separated at a distance of 200 mm. Thus, far infrared rays were applied to the plates for 3 minutes. The moisture content of the plates directly after heating, was 15.5% by weight. The heated plates were dried in a hot air drying conveyor having a region at a temperature of 100° to 200° C. for 1 hour. The plates thus dried had a moisture content of 1.0% by weight, and then they were calcined at 550° C., glazed and fired at 1120° C. in a shuttle kiln to obtain earthern ware type plates (A).

For comparison, as the starting material the same composition as mentioned above was used to obtain another kind of earthern ware plates (B) in the same manner as mentioned above except that the heating before rolling and the application of far infrared rays after rolling were not conducted.

200 plates were thus prepared for each of earthern wares (A) and (B), and they were examined on the percentage of rejects due to any of strain, warp and cracks. As a result, the percentage of rejects was 5% for (A) in accordance with this invention, and 26% for (B) due to cracks and 11% for (B) due to strain or warp.

The bending strength of (A) was determined to be 210 kg/cm in the direction of drawing and 130 kg/cm in the direction perpendicular to that of drawing.

Thus, the ceramic plates according to this invention have a directional property in bending strength, and it can be produced in a large size but nevertheless at a highly low percentage of rejects and high in-plane precision.

EXAMPLE 2

A mixture comprising 45 parts by weight of feldspar, 30 parts by weight of clay, 20 parts by weight of mullite-containing grog, 5 parts by weight of talc and 0.2 part by weight of sodium phosphate was drawn from a deairing pug-mill into a hollow cylindrical form of 230 mm in diameter and 20 mm in thickness. This form was cut and spread in a plate form, and the resulting plates were then transferred to a pair of rollers at 30° C. in the same direction as that of drawing. Each of the rollers has a channel helically cut in the surface thereof in a direction opposite to the direction of the channel in the other roller, so as to prevent the rolled green body from being squeezed out beyond the width of the rollers. The plates were rolled through the pair of rollers to be of 30×60 cm in size and 5 mm in thickness, and they were passed through the same type of a far infrared ray heater as used in EXAMPLE 1 which was provided directly before the inlet of a hot air dryer with a mesh belt conveyor. The resulting plates had a moisture content of 16.1%. Then the plates were passed through the hot air dryer at a temperature of 100° to 200° C. for 1 hour. The plates thus dried were simultaneously calcined at 550° C. in the dryer.

The dried and calcined plates were glazed and transferred in the same direction as that of drawing to a roller hearth kiln (roller pitch: 70 mm) and fired at 1200° C. for 1 hour.

1000 fully vitrified plates were thus prepared and determined for a percentage of rejects due to strain or warp. As a result, the percentage of rejects was only 3%. These ceramic plates also were observed to have a directional property in bending strength, that is, the bending strength was 450 kg/cm in the direction of drawing and 310 kg/cm in the direction perpendicular to that of drawing.

On the other hand, when the plates were passed through a pair of rollers and then through the roller hearth kiln in the direction perpendicular to that of drawing, the side edges of products were often deformed and the percentage of rejects was 23%.

Furthermore, plates rolled in the direction perpendicular to that of drawing had no orientation in crystal structure. Such plates had equal bending strength both in the directions when calcined. They were partially deformed and cracked when fired in the roller hearth kiln. The percentage of rejects was 28%.

For further comparison, green plates of the same size as mentioned above were prepared by a prior powder forming method and fired in a roller hearth kiln in the same manne as mentioned above. The precentage of rejects was as high as 35%. Thus, such method is disadvantageous in industries.

EXAMPLE 3

A mixture comprising 54 parts by weight of feldspar, 41 parts by weight clay, 5 parts by weight of talc and 0.2 part by weight sodium phosphate and having a moisture content of 19.5% by weight was drawn from a deairing pug-mill having an opening to produce a hollow cylindrical form of 23.0 mm in diameter and 20 mm in thickness. The resulting form was cut and spread in a plate form. The resulting plates were then rolled in the same direction as that of drawing to be 30×60 cm in size and 4 mm in thickness. These green plates were passed through a hot air dryer with a mesh belt in the same direction as that of drawing. Before the inlet of the hot air dryer there was provided a far infrared ray heater, in which the moisture of the green plates were more than 15% by weight so that the plates could be treated with the far infrared rays.

The dried and calcined plates were glazed and then transferred in the same direction as that of drawing to a roller hearth kiln (roller pitch: 70 cm) with such slit nozzle quenching means as mentioned below. The maximum temperature in the kiln was 1200° C.

The plates were observed from its high-temperature viscosity curve to have a transition point of 1150° C. A pair of cold air ejecting slit nozzles were provided at a site at which the plates reached a temperature of 1160° C., above and under the rollers, respectively, and positioned at a distance of 50 mm from the surfaces of the fired plates. The width of the slit nozzles was 30 mm. Cold air at room temperature was sprayed at a static air pressure of 450 mmAq to the plates at both the surfaces thereof, thereby allowing the plates to be cooled at a rate of 200° C./minute.

The cooling stage of the roller hearth kiln was designed so that the plates were cooled from 1000° C. to 700° C. at a rate of about 50° C./minute.

200 green body plates were fired in the roller hearth kiln with the slit nozzle quenching stage. The percentage of rejects due to strain or warp was less than 1.0%.

As is clear from the comparison of this invention with the comparative examples mentioned above, the method of this invention makes it possible to produce large thin ceramic plates of, for example, 30×30 cm or more in size and 20 mm or less, especially 8 mm or less in thickness without any strain or warp and with high in-plane precision, in an industrial scale.

What is claimed is:

1. A method for producing ceramic plates which comprises drawing a green body from an extruder in a curved shape, cutting and spreading said green body in a plate form, rolling the resulting green plates in the same direction as that of drawing, subjecting the rolled plates to heat treatment with far infrared rays or high-frequency heating before the plates contain a moisture content reduced to less than 15% while the plates are transferred in the same direction as that of drawing, drying the plates thus treated while the plates are further transferred in the same direction, and then firing the plates in a kiln.

2. The method according to claim 1, wherein said extruder is a deairing pug-mill.

3. The method according to claim 1, wherein calcining is conducted after the drying step and before the firing step.

4. The method according to claim 1, wherein the firing is conducted in a roller hearth kiln while the plates are transferred in the same direction as that of drawing from the extruder.

5. The method according to claim 4, wherein cold air is sprayed through slit nozzles against the plates at both the top and bottom surfaces thereof, directly after the plates have been transformed into a vitreous phase in the roller hearth kiln and before the plates begin to be solidified, thereby quenching the plates to a solid state.

6. The method according to claim 5, wherein the quenching is conducted in a cooling rate of 100° C./minute at the surfaces of the plates.

7. The method according to claim 1, wherein the temperature and the period of time for firing in a kiln are sufficient to vitrify the green body.

8. The method according to claim 1, wherein the temperature and the period of time for firing in a kiln are insufficient to eliminate the orientability of crystals in the direction of drawing the green body.

9. The method according to claim 1, wherein the heat treatment with, far infrared rays or high-frequency heating is conducted before or during the rolling step.

10. The method according to claim 9, wherein the heat treatment is conducted at a temperature of 30° to 60° C.

11. The method according to claim 1, wherein the drying is conducted at a temperature of 70° to 550° C. for a period of 30 minutes to 2 hours.

12. The method according to claim 1, wherein the plates are glazed after drying.

* * * * *

UNITED STATES PATENT AND TRADEMARK OFFICE
CERTIFICATE OF CORRECTION

PATENT NO. : 4,495,118

DATED : January 22, 1985

INVENTOR(S) : Hideo Ikami

It is certified that error appears in the above-identified patent and that said Letters Patent is hereby corrected as shown below:

| | |
|---|---|
| 1st page, No. "[73] Assignee:" | Delete "Nippon Chemiphar Co., Ltd., Tokyo, Japan" and substitute --Asahi Kasei Kogyo Kabushiki Kaisha, Osaka, Japan-- |
| Page 1, under "U.S. Patent Documents" | 4th line delete "Harsler" and substitute --Hassler-- |
| Col. 2, line 25 | After "weight." delete ".P" and start new paragraph with "The" |
| Col. 10, line 12 | After "with" delete "," |

Signed and Sealed this

Seventeenth Day of September 1985

[SEAL]

*Attest:*

*Attesting Officer*

DONALD J. QUIGG

*Commissioner of Patents and Trademarks—Designate*